United States Patent [19]
Ishii et al.

[11] Patent Number: 5,500,843
[45] Date of Patent: Mar. 19, 1996

[54] INFORMATION PROCESSING APPARATUS WITH MOVABLE SPINDLE SHAFTS

[75] Inventors: Masaru Ishii, Kamakura; Koichi Nagai, Kawasaki, both of Japan

[73] Assignee: Kabushiki Kaisha Toshiba, Kawasaki, Japan

[21] Appl. No.: 215,577

[22] Filed: Mar. 22, 1994

[30] Foreign Application Priority Data

May 26, 1993 [JP] Japan ................................. 5-124446

[51] Int. Cl.⁶ .................................................. G11B 33/02
[52] U.S. Cl. ........................................ 369/77.2; 369/270
[58] Field of Search ............................... 369/75.2, 77.1, 369/77.2, 263, 264, 266, 269, 270, 271

[56] References Cited

U.S. PATENT DOCUMENTS

| | | | |
|---|---|---|---|
| 3,680,872 | 8/1972 | Hiraki | 369/270 |
| 4,328,575 | 5/1982 | Elliott | 369/269 |
| 4,410,971 | 10/1983 | Eisemann | 369/266 X |
| 4,481,619 | 11/1984 | Oozeki | 369/270 |
| 4,482,993 | 11/1984 | Agostini | 369/263 |
| 4,587,647 | 5/1986 | Mak et al. | 369/270 |
| 4,658,311 | 4/1987 | Sakaguchi | 360/97 |
| 4,680,748 | 7/1987 | Kobayashi | 369/77.1 |
| 4,941,140 | 7/1990 | Ono et al. | 369/264 |
| 5,058,094 | 10/1991 | Suzuki | 369/77.1 |
| 5,062,099 | 10/1991 | Odawara et al. | 369/263 |
| 5,121,379 | 6/1992 | Funabashi et al. | 369/270 |

FOREIGN PATENT DOCUMENTS

| | | | |
|---|---|---|---|
| 62-54863 | 3/1987 | Japan | 369/270 |
| 5-6633 | 1/1993 | Japan . | |

*Primary Examiner*—Stuart S. Levy
*Assistant Examiner*—William J. Klimowicz
*Attorney, Agent, or Firm*—Cushman, Darby & Cushman

[57] ABSTRACT

An optical disk apparatus includes a turntable with a bearing surface, and a spindle motor for rotating the turntable. The spindle shaft has a cylindrical first shaft having an upper end flush with the bearing surface, and a second shaft having an upper end portion and arranged in the first shaft to be slidable between an engaging position in which the upper end portion projects from the upper end of the first shaft to engage a center hole of an optical disk placed on the bearing surface and a depressed position in which the upper end portion is recessed from the upper end of the first shaft to be disengaged from the optical disk. The second shaft is moved by a spindle moving mechanism from the first position to the second position when the optical disk is to be loaded on and unloaded from the turntable.

6 Claims, 13 Drawing Sheets

INFORMATION PROCESSING APPARATUS WITH MOVABLE SPINDLE SHAFTS

BACKGROUND OF THE INVENTION

1. Field of the Invention

The present invention relates to an information processing apparatus for reproducing information from a disk-shaped optical information recording medium having a center portion, by receiving the medium and projecting a light beam on the medium.

2. Description of the Related Art

In an information processing apparatus, e.g., an optical disk apparatus, a cartridge which contains an optical disk, for use as a recording medium, is horizontally inserted into the apparatus through a loading aperture, and is held in a cartridge holder. When the cartridge is fed into a predetermined position in the cartridge holder, the holder descends. As the holder descends in this manner, the optical disk in the cartridge is mounted on a spindle motor, and an information recording surface of the disk is brought close to an optical head.

The spindle motor includes a turntable for positioning the optical disk with respect to the axial direction thereof, a spindle mounted on the central portion of the turntable and defining the center of rotation of the disk, and a motor section for rotating the spindle and the turntable.

The spindle is fitted in a center hole of the optical disk, thereby centering the disk securely. To this end, the tip portion of the spindle is tapered so that it can be easily aligned with the center hole of the optical disk, and projects above the upper surface of the turntable. In general, the optical disk has a hub with a predetermined thickness which defines the center hole. In consideration of the thickness of the hub, the tip portion of the spindle should project long enough above the upper surface of the turntable.

If the spindle for positioning the center of rotation of the optical disk always projects above the turntable surface in this manner, however, a relatively long distance must be secured between the loading path of the cartridge and the turntable surface in order to avoid a collision between the cartridge and the spindle tip when the cartridge is inserted or ejected in the horizontal direction, that is, in the direction parallel to the turntable surface along the loading path. Accordingly, the profile of the whole apparatus cannot be thinned with ease.

The same problem lies on an information processing apparatus of a type such that the optical disk or the recording medium is received directly without being contained in the cartridge.

SUMMARY OF THE INVENTION

The present invention has been contrived in consideration of these circumstances, and its object is to provide an information processing apparatus having a thinner profile.

In order to achieve the above object, an information processing apparatus according to the present invention comprises: means for supporting the recording medium, the supporting means including a bearing surface on which the recording medium is to be placed; means having an rotating shaft portion, for rotating the recording medium placed on the bearing surface; means for positioning the recording medium on the bearing surface, the positioning means being provided at the rotating shaft portion to be movable between a first position in which the positioning means projects above the bearing surface to engage the central portion of the recording medium and a second position in which the positioning means is recessed from the bearing surface; and means for moving the positioning means to the second position as the recording medium is to be placed on the bearing surface.

Another information processing apparatus according to the invention comprises: means for supporting the recording medium, the supporting means including a bearing surface on which the recording medium is to be placed; means having an rotating shaft portion, for rotating the recording medium placed on the bearing surface; means for positioning the recording medium on the bearing surface, the positioning means being provided at the rotating shaft portion to be movable between a first position in which the positioning means projects above the bearing surface to engage the central portion of the recording medium and a second position in which the positioning means is recessed from the bearing surface; first moving means for moving the recording medium between a third position in which the recording medium is placed on the bearing surface and a fourth position in which the recording medium is away from the bearing surface; and second moving means for moving the positioning means from the second position to the first position in interlock with the movement of the recording medium from the fourth position to the third position.

According to the information processing apparatuses constructed in this manner, the positioning means is movable between the first position and the depressed position. In placing or replacing the information recording medium from the bearing surface of the supporting means, the positioning means is moved to the second in which it is recessed from the bearing surface of the supporting means. The positioning means is moved to the first position to engage the central portion of the recording medium only when the recording medium is placed on the bearing surface. In inserting or ejecting the recording medium, therefore, the positioning means never prevents the movement of the recording medium, so that the distance between a loading path of the recording medium and the bearing surface of the supporting means can be shortened. Thus, the profile of the whole apparatus can be thinned.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2 to 10 show an optical disk apparatus according to an embodiment of the present invention, in which:

FIGS. 12 and 13 show an optical disk apparatus according to still another embodiment of the invention, in which:

DETAILED DESCRIPTION OF THE PREFERRED EMBODIMENTS

Preferred embodiments of the present invention applied to an optical disk apparatus will now be described in detail with reference to the accompanying drawings.

Figure 1:
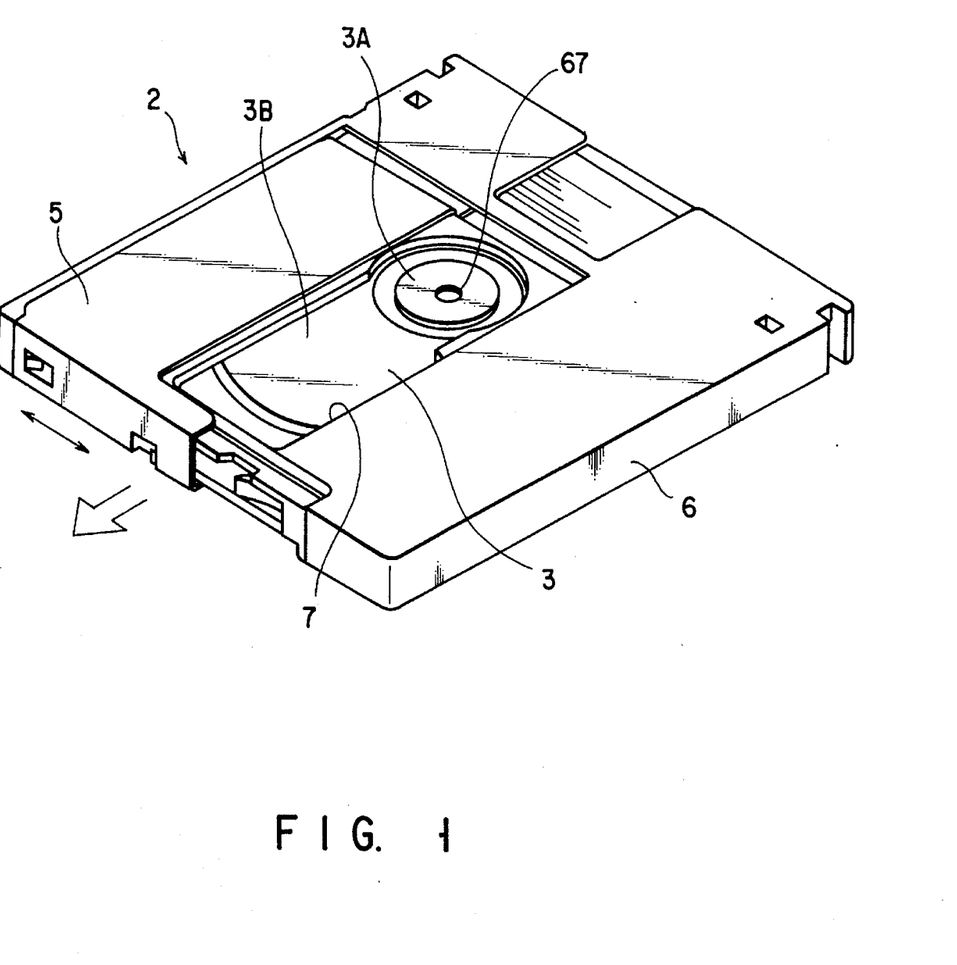
FIG. 1 is a perspective view showing a cartridge having an optical disk therein.

FIG. 1 shows a cartridge 2 which is used in the optical disk apparatus. The cartridge 2 has a flat rectangular cartridge body 6 which contains an optical disk 3 for use as an information recording medium. A window 7 for access to the disk 3 is formed on each side of the cartridge body 6 so that part of each corresponding side of the disk 3 is exposed through the window. An integral double-sided shutter 5 is slidably mounted on the cartridge body 6, whereby the windows 7 are opened and closed. The shutter 5 is continually urged to close the windows 7 by a spring (not shown).

The optical disk 3 includes a disk body 3B and a hub 3A fixed to the central portion of the body 3B. The hub 3A is formed of a magnetic material, and has a center hole 67.

Figure 2:
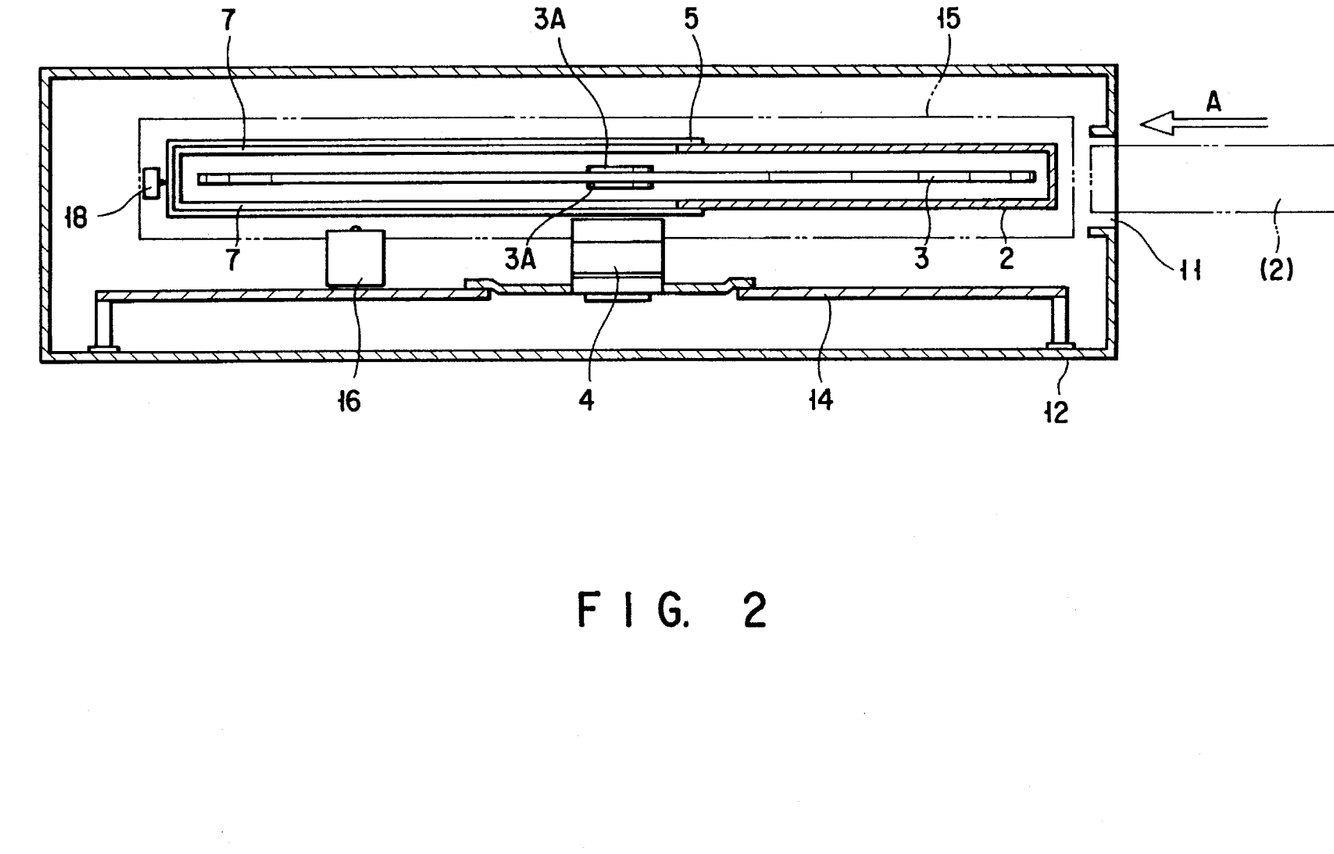
FIG. 2 is a sectional view of the apparatus schematically showing a state in which the cartridge is received in the apparatus.
Figure 3:
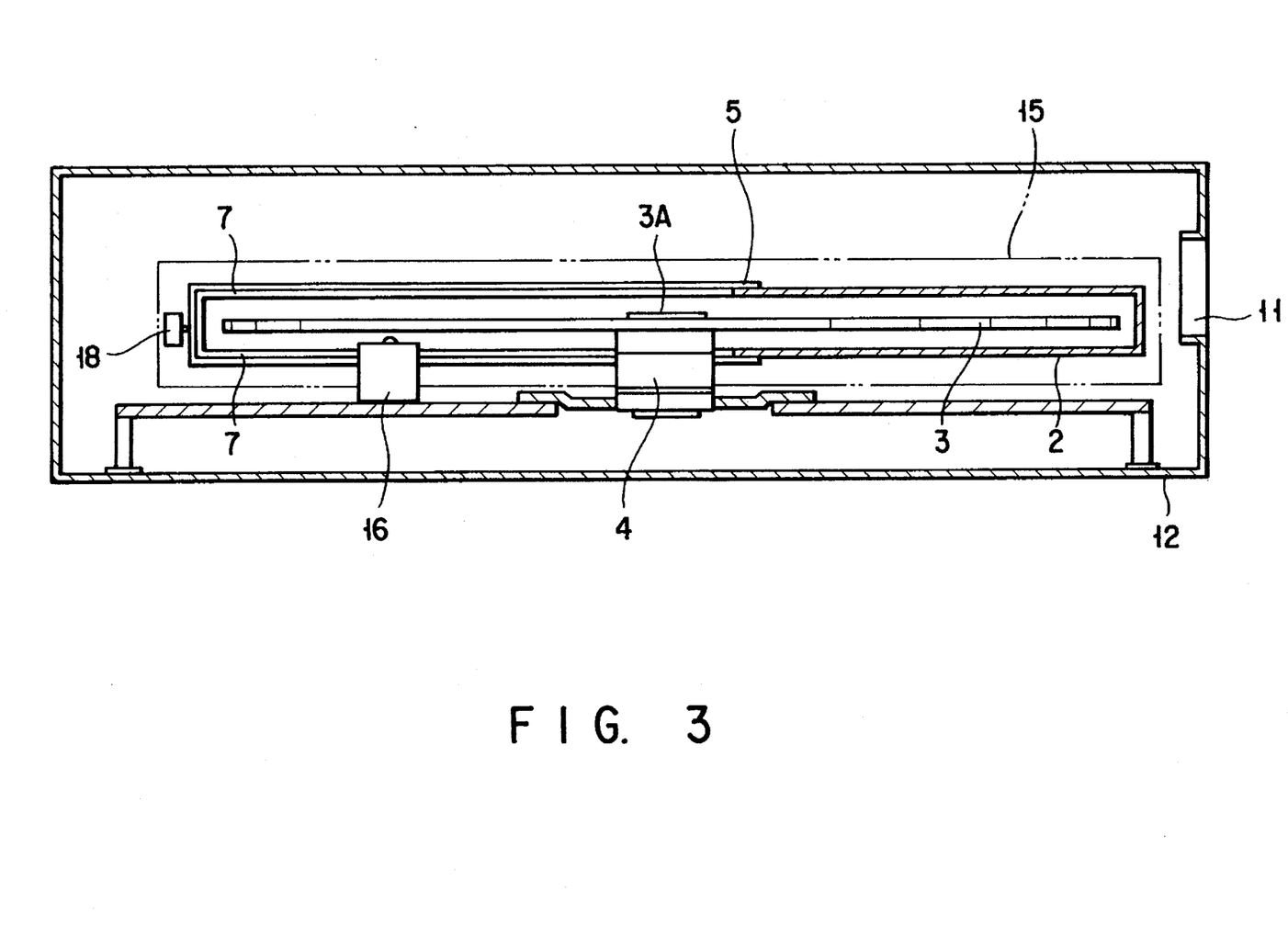
FIG. 3 is a sectional view of the apparatus showing a state in which the cartridge is in a set position for recording or reproducing operation.

As shown in FIGS. 2 and 3, the optical disk apparatus comprises a rectangular housing 12. Formed in the front face of the housing 12 is a loading slot 11 through which the cartridge 2 is loaded into or ejected from the apparatus. A loading mechanism 15 (mentioned later) is arranged in the housing 12. The cartridge 2 inserted into the housing 12 through the slot 11 is moved from a standby position shown in FIG. 2 to a set position shown in FIG. 3 by the loading mechanism.

Arranged in the housing 12, moreover, are a spindle motor 4 for supporting and rotating the optical disk 3 in the set cartridge 2 and an optical head 16 for recording on and reproducing information from the disk. The motor 4 is fixed to a base 14 which is set in the housing 12, and the head 16 is provided on the base 14 in a manner such that it can be reciprocated in the radial direction of the optical disk 3 by means of a guide mechanism (not shown) and a drive mechanism, such as a linear motor (not shown).

Figure 4:
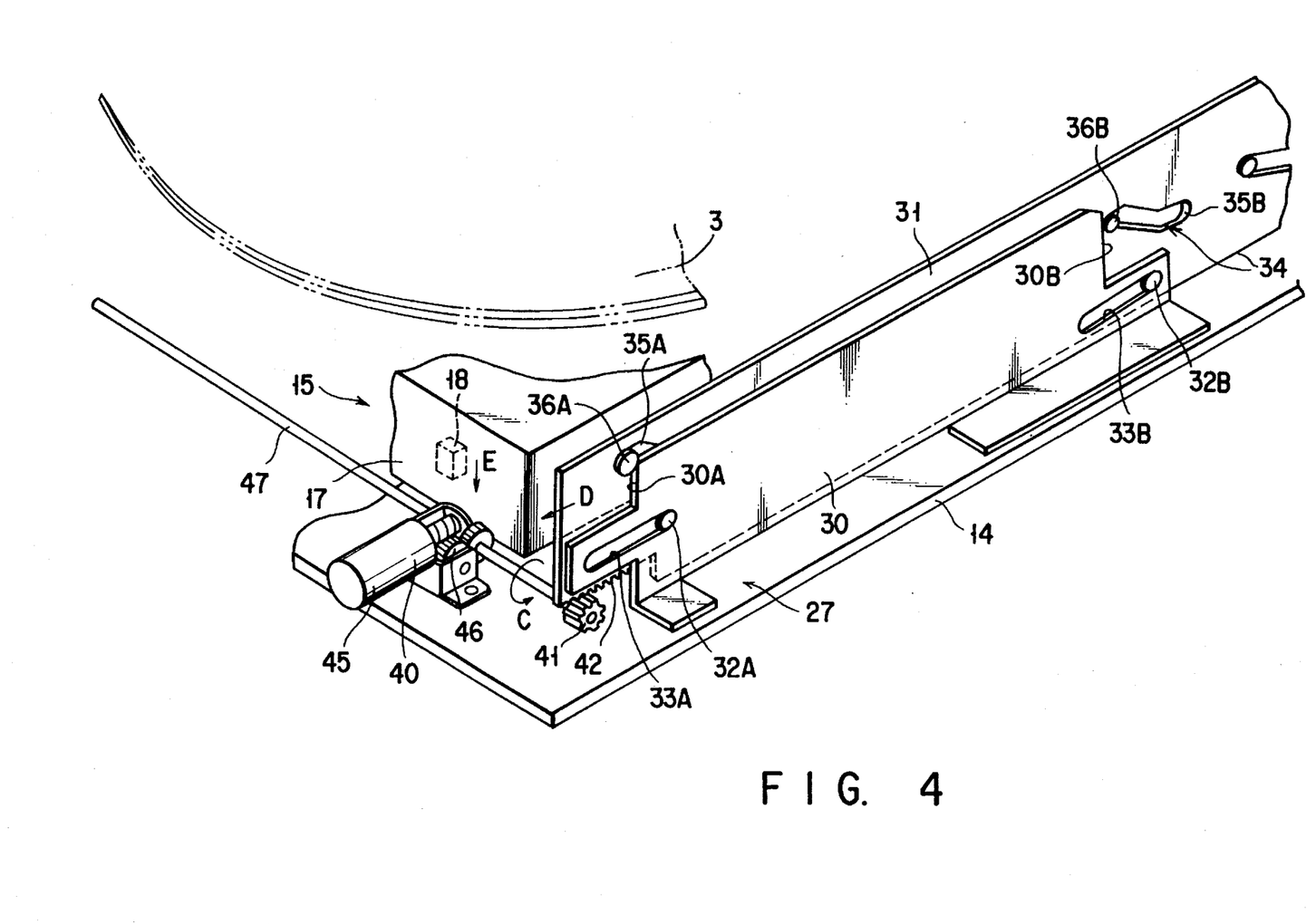
FIG. 4 is a perspective view showing part of a loading mechanism of the apparatus.

As shown in FIGS. 2 to 4, the loading mechanism 15 comprises a cartridge holder 17 for receiving and holding the cartridge 2 inserted in the direction of arrow A through the loading slot 11. The holder 17 is mounted with a shutter operating mechanism (not shown), and the shutter 5 is opened by the mechanism as the cartridge 2 is received in the holder.

A microswitch 18 for use as detecting means is provided in the inner part of the cartridge holder 17, that is, at the forward end thereof with respect to the loading direction of the cartridge 2. When the cartridge 2 is inserted into a predetermined position in the cartridge holder 17 such that it presses the microswitch 18, as shown in FIG. 2, a driving signal is delivered to a cartridge holder moving mechanism 27 (mentioned later) by means of a control device (not shown). As a result, the cartridge 2, along with the holder 17, is lowered to the set position shown in FIG. 3. The fall of the holder 17 is a necessary distance for the hub 3A of the optical disk 3 to engage a turntable 50 (mentioned later) through one of the windows 7 of the cartridge 2.

In the set position, the optical disk 3 in the cartridge 2 is mounted on the spindle motor 4, and its lower surface is situated adjacent to the optical head 16.

As shown in FIG. 4, the holder moving mechanism 27 for raising and lowering the cartridge holder 17 together with the cartridge 2 is provided with a pair of parallel guide plates 30 (only one of which is shown) on either side of the cartridge holder 17. These guide plates are set up on the base 14. A cam plate 31 for use as a movable cam member is located between each guide plate 30 and the holder 17.

Two guide rollers 32A and 32B are arranged on the outer surface of each cam plate 31, and are fitted in two horizontal guide slots 33A and 33B, respectively, in the guide plate 30. Thus, the cam plate 31 can reciprocate only in the horizontal direction between first and second positions (mentioned later) along the slots 33A and 33B.

Each cam plate 31 is coupled to a side face of the cartridge holder 17 which faces the plate 31 across a connection mechanism 34. The connection mechanism 34 includes a pair of cam slots 35A and 35B formed in the cam plate 31, a pair of guide rollers 36A and 36B mounted on the side face of the holder 17 and fitted in the slots 35A and 35B, respectively, and a pair of guide end faces 30A and 30B of each guide plate 30, which extend vertically and are in contact with the circumferential surfaces of the rollers 36A and 36B, respectively. Each of the cam slots 35A and 35B is composed of two horizontal portions on different levels and a slant portion connecting the two.

The loading mechanism 15 serving as first moving means comprises a cam plate drive mechanism 40 for moving the cam plate 31 in the horizontal direction. The mechanism 40 includes a pair of racks 42 and a pair of pinion gears 41 in mesh with their corresponding racks. Each rack 42 is formed on the lower edge of one end portion of each corresponding cam plate 31, and extends in the horizontal direction. The pinion gears 41 are fixed to a shaft 47 which extends at right angles to the cam plates 31. Also, the drive mechanism 40 includes a reversible motor 45 which is fixed on the base 14. The motor 45 serves to rotate the pinion gears 41 with the aid of a gear train 46 and the shaft 47.

When the pinion gears 41 are rotated in the direction of arrow C of FIG. 4 by means of the motor 45, each cam plate 31, having the rack 42 thereon, moves in the direction of arrow D, from a first position (illustrated) to a second position in which the guide rollers 32A and 32B abut against the other ends of the guide slots 33A and 33B, respectively.

In response to this, the cartridge holder 17 descends in the direction of arrow E, from an up position to a down position, guided by the cam slots 35A and 35B and the guide end faces 30A and 30B. Accordingly, the cartridge 2 held in the holder 17 is moved from the standby position (fourth position) shown in FIG. 2, in which it can avoid interfering with the spindle motor 4, to the set position (third position) shown in FIG. 3 in which the cartridge is mounted on the motor 4 to be ready for recording or reproducing operation.

When the pinion gears 41 are rotated reversely by the motor 45, the cartridge holder 17 is moved from the down position to the up position, and the cartridge 2 in the holder 17 is moved from the set position to the standby position.

Figure 5:
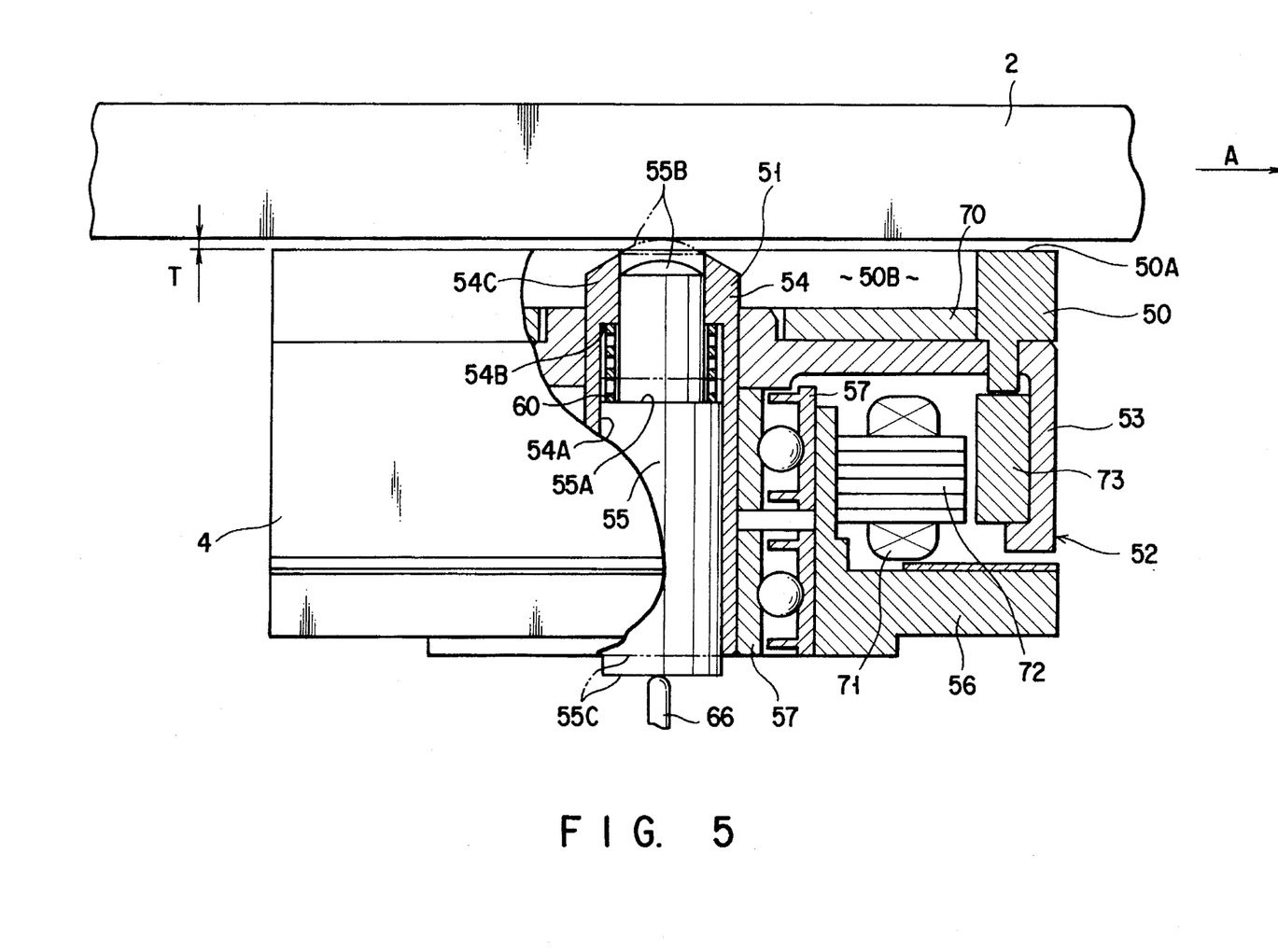
FIG. 5 is a cutaway side view showing a spindle motor.

As shown in FIG. 5, the spindle motor 4 generally includes the turntable 50 serving as supporting means, a spindle 51 provided at the central portion of the turntable, and a motor section 52 for rotating the spindle unit and the turntable. The turntable 50 has an upper surface 50A on which the optical disk 3 is placed. The spindle 51 serves as a rotating shaft portion which defines the center of rotation of the disk 3.

The turntable 50 is fixed to a rotor 53 of the motor section 52, and rotates together with the rotor 53. The upper surface 50A of the turntable 50 serves both as a bearing surface which supports the optical disk 3 and a positioning surface for positioning the disk 3 with respect to the axial direction of the disk.

The spindle 51 has a dual structure which includes a first spindle 54 in the form of a hollow cylinder and an inner second spindle 55 slidably fitted in the bore 54A of the first spindle. The first spindle 54 is rotatably held on a motor base 56 of the motor section 52 by means of two ball bearings 57, and the rotor 53 is fitted on the first spindle for integral rotation. An upper end 54C of the first spindle 54 is flush with the upper surface 50A of the turntable 50.

The inner second spindle 55 serving as positioning means is a stepped shaft whose upper end portion is a little smaller in diameter. Likewise, the bore 54A of the first spindle 54, which is fitted with the second spindle 55, is a stepped hole whose upper end portion is a little smaller in diameter. A compression coil spring 60 for use as urging means is interposed between a stepped portion 55A of the second spindle 55 and a stepped portion 54B of the bore 54A.

The second spindle 55 is continually pressed down to a depressed position (a second position) (indicated by full line in FIG. 5) by means of the urging force of the compression coil spring 60 so that its upper end 55B is recessed from the upper end 54C of the first spindle 54, that is, the tip of the spindle 51 is depressed below the upper surface 50A of the turntable 50.

When the second spindle 55 is raised to an engaging position (a first position) indicated by two-dot chain line by means of a lifting pin 66 of a spindle moving mechanism 65 (mentioned later), moreover, its upper end 55B projects from the upper end of the first spindle 54. Thereupon, the respective slanting guide surfaces of the upper end 55B and the upper end 54C of the first spindle 54 become continuous with each other, thus forming a spindle tip portion having a tapered guide surface.

An annular recess 50B is formed in the upper surface of the turntable 50 so as to surround the spindle 51. A ring-shaped chucking magnet 70 is disposed at the bottom of the recess 50B, and is fixed to the rotor 53. When the optical disk 3 is placed on the turntable 50 so that the tip portion of the spindle 51 is fitted in the center hole 67 of the hub 3A of the disk, the hub is housed in the recess 50B and magnetically attracted to the chucking magnet 70. Thereupon, the disk 3 is held in a manner such that the lower surface of the disk body 3B is intimately in contact with the upper surface 50A of the turntable 50 so as to rotate integrally with the turntable.

The motor base 56 is fitted with a stator core 72 which has a stator coil 71 thereon, while a rotor magnet 73 is fixed to the inner surface of the rotor 53, thus forming the motor section 52.

Figure 6:
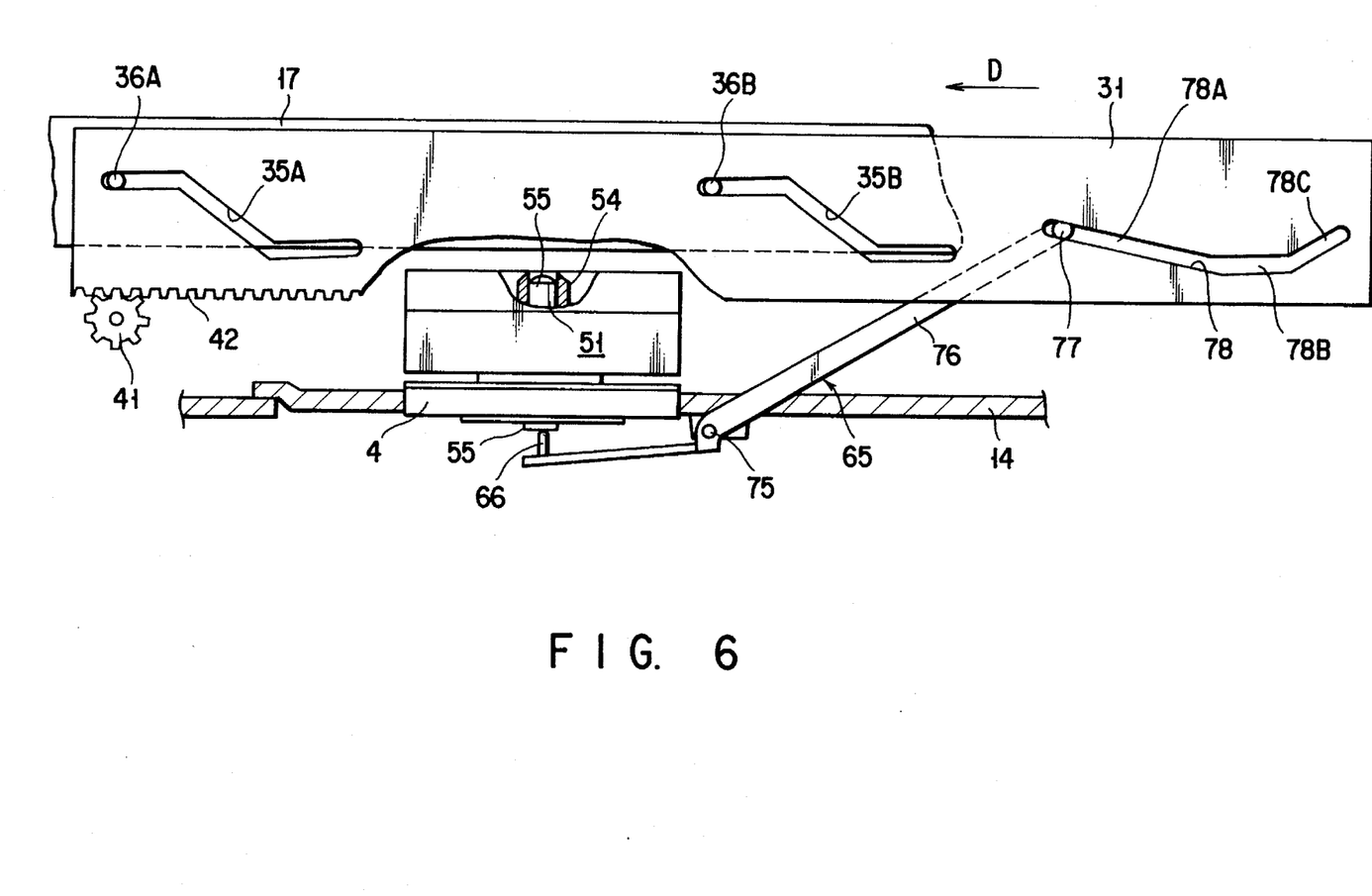
FIG. 6 is a side view showing a spindle moving mechanism at the start of loading operation.
Figure 7:
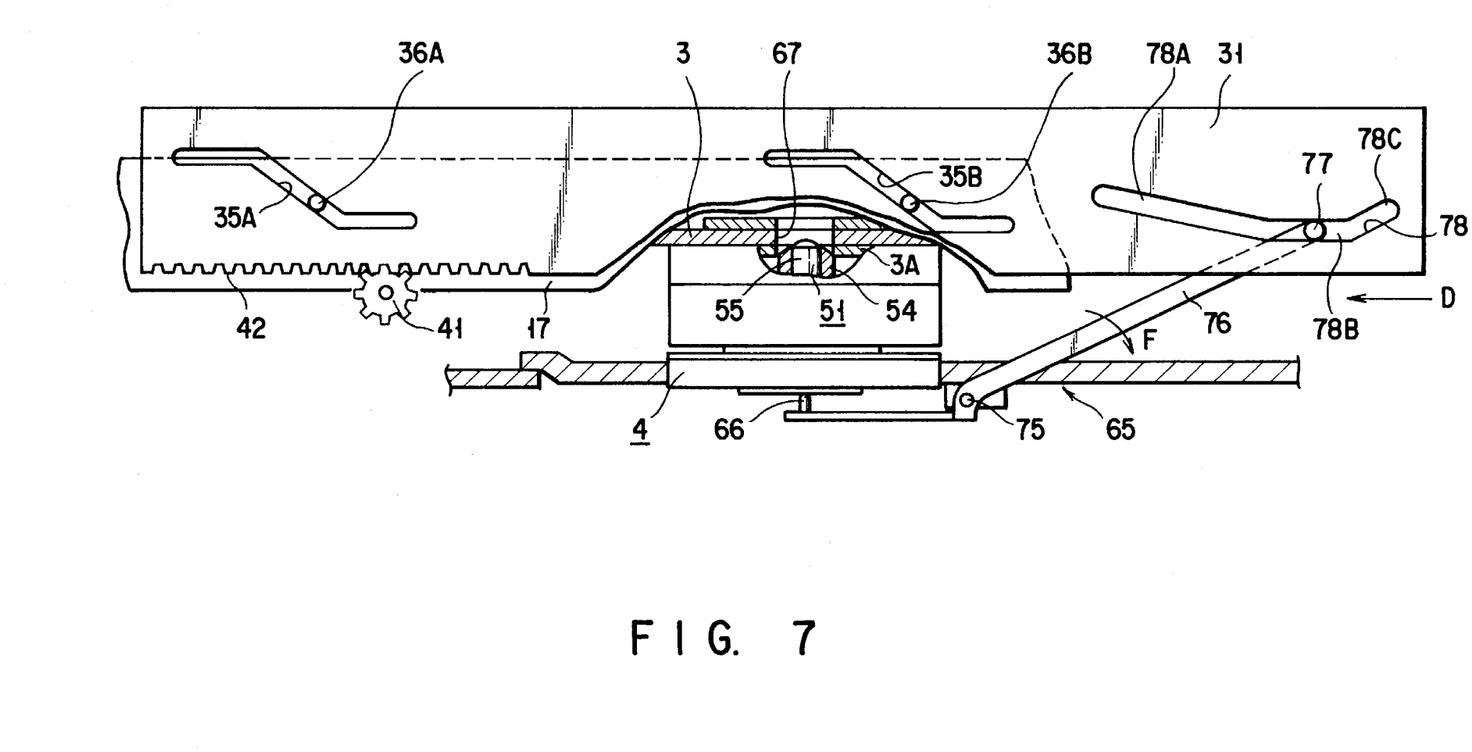
FIG. 7 is a side view showing the spindle moving mechanism during the loading operation.
Figure 8:
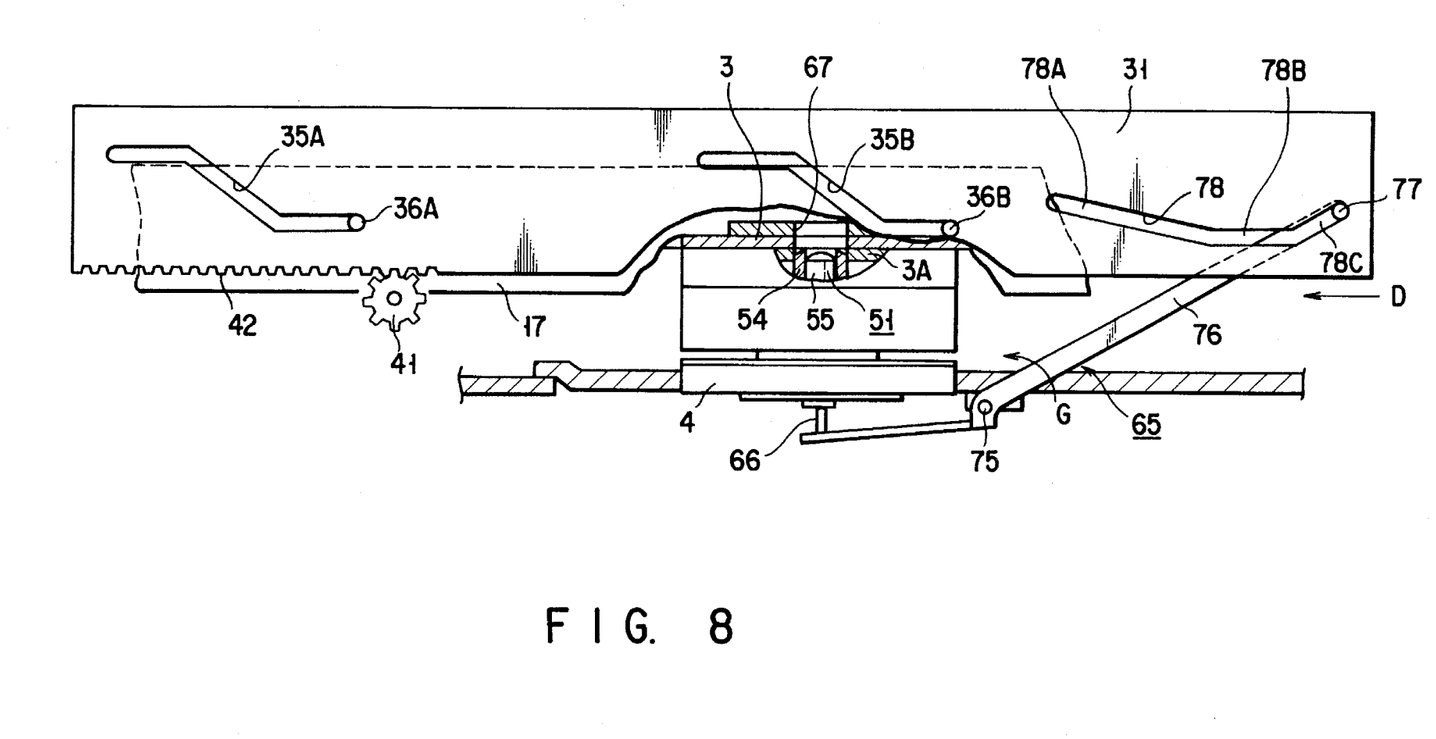
FIG. 8 is a side view showing the spindle moving mechanism at the end of the loading operation.

As shown in FIGS. 6, 7 and 8, the spindle moving mechanism 65 serving as moving means or second moving means for raising and lowering the second spindle 55 of the spindle 51 includes an operating lever 76, which is supported on the base 14 so as to be swingable around a pivot 75. A pin 66 protrudes from one end portion of the lever 76, and its distal end engages a flat lower end face 55C of the second spindle 55.

A guide roller 77 is provided on the other end of the operating lever 76, and is in fitted in a cam slot 78 which is formed in one of the cam plates 31. The slot 78 is composed of a descent portion 78A, horizontal portion 78B, and ascent portion 78C, which are continuous with one another. Thus, the lever 76 is swung around the pivot 75 as the cam plate 31 moves.

When each cam plate 31 and the cartridge holder 17 are in the first position and the up position, respectively, the guide roller 77 is situated in the upper end portion of the descent portion 78A of the cam slot 78. In this state, moreover, the lifting pin 66 protruding from the one end portion of the operating lever 76 is lowered, and the second spindle 55 is in the depressed position with its tip recessed from the upper surface 50A of the turntable 50.

When the cartridge 2 is horizontally inserted into the predetermined position in the cartridge holder 17 through the loading slot 11 of the housing 12, each cam plate 31 is moved in the direction of arrow D of FIG. 6 by the loading mechanism 15, and the cartridge 2 and the holder 17 are lowered. As the cam plate 31 moves, the guide roller 77 is moved to the horizontal portion 78B of the cam slot 78 which connects with the lower end of the descent portion 78A, as shown in FIG. 7. As this is done, the operating lever 76 rocks clockwise (in the direction of arrow F) around the pivot 75, so that the lifting pin 66 rises. Accordingly, the second spindle 55 is pushed up to the engaging position by the pin 66, and its tip projects above the upper surface 50A of the turntable 50.

At this time, the cartridge holder 17 moves to the down position, and the cartridge 2 in the holder approaches the spindle motor 4. Thereupon, the hub 3A of the optical disk 3 in the cartridge 2 is magnetically attracted to the turntable 50 by the agency of the chucking magnet 70 in the recess 50B of the turntable 50. Moreover, the spindle 51 of the spindle motor 4 is fitted in the center hole 67 of the disk 3, whereby the disk 3 is centered with respect to the turntable 50.

When each cam plate 31 is moved to the second position so that the loading is finished, as shown in FIG. 8, the guide roller 77 is situated in the upper end portion of the ascent portion 78C of the cam slot 78. As the roller 77 moves, the operating lever 76 rocks counterclockwise (in the direction of arrow G) around the pivot 75. Thereupon, the lifting pin 66 is restored to the down position (a release position), and the second spindle 55 is moved to the depressed position in which its tip is recessed from the upper surface 50A of the turntable 50.

Figure 9:
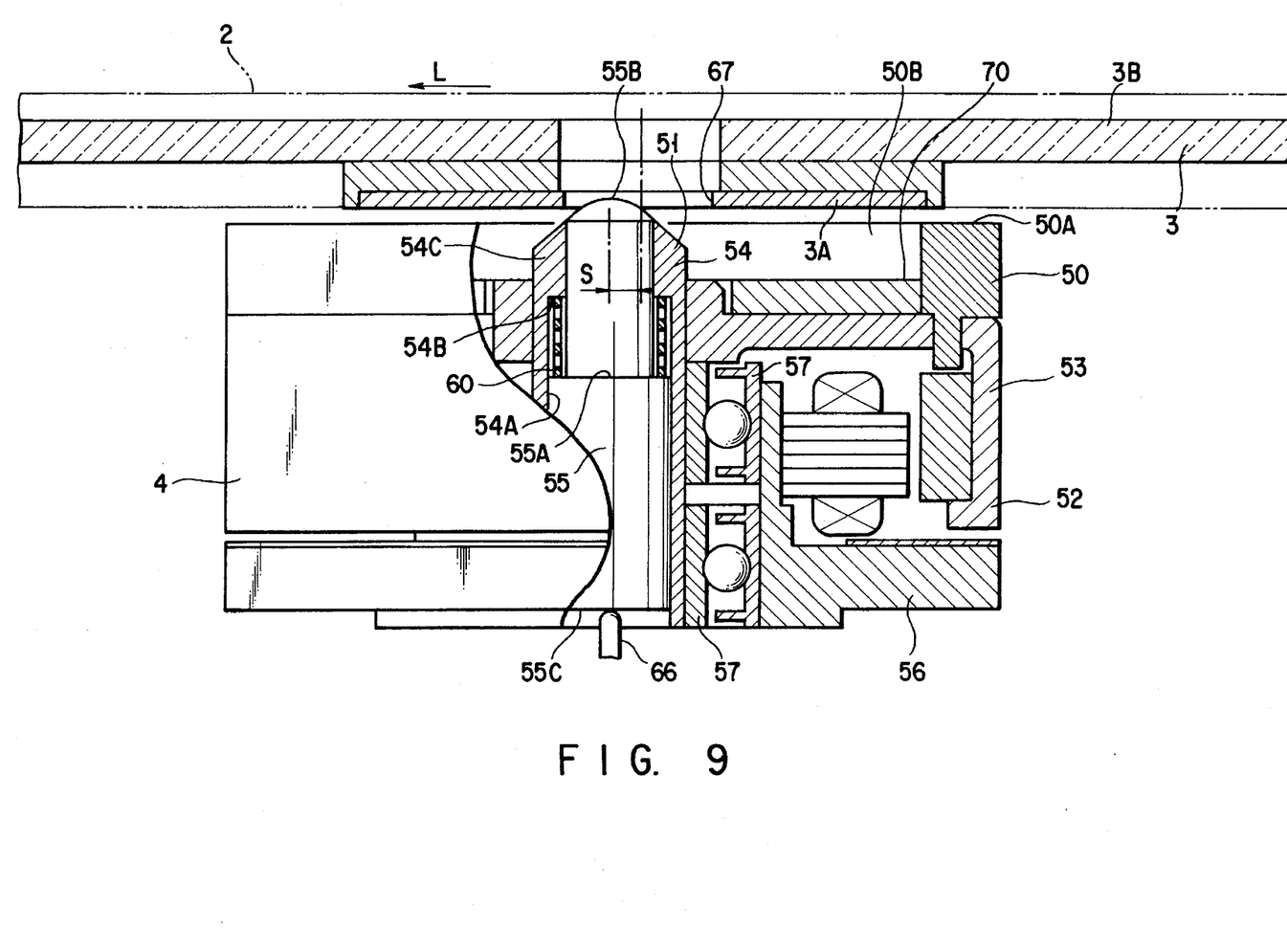
FIG. 9 is a cutaway side view showing the spindle motor and the optical disk in a state immediately before the disk is set on a turntable.
Figure 10:
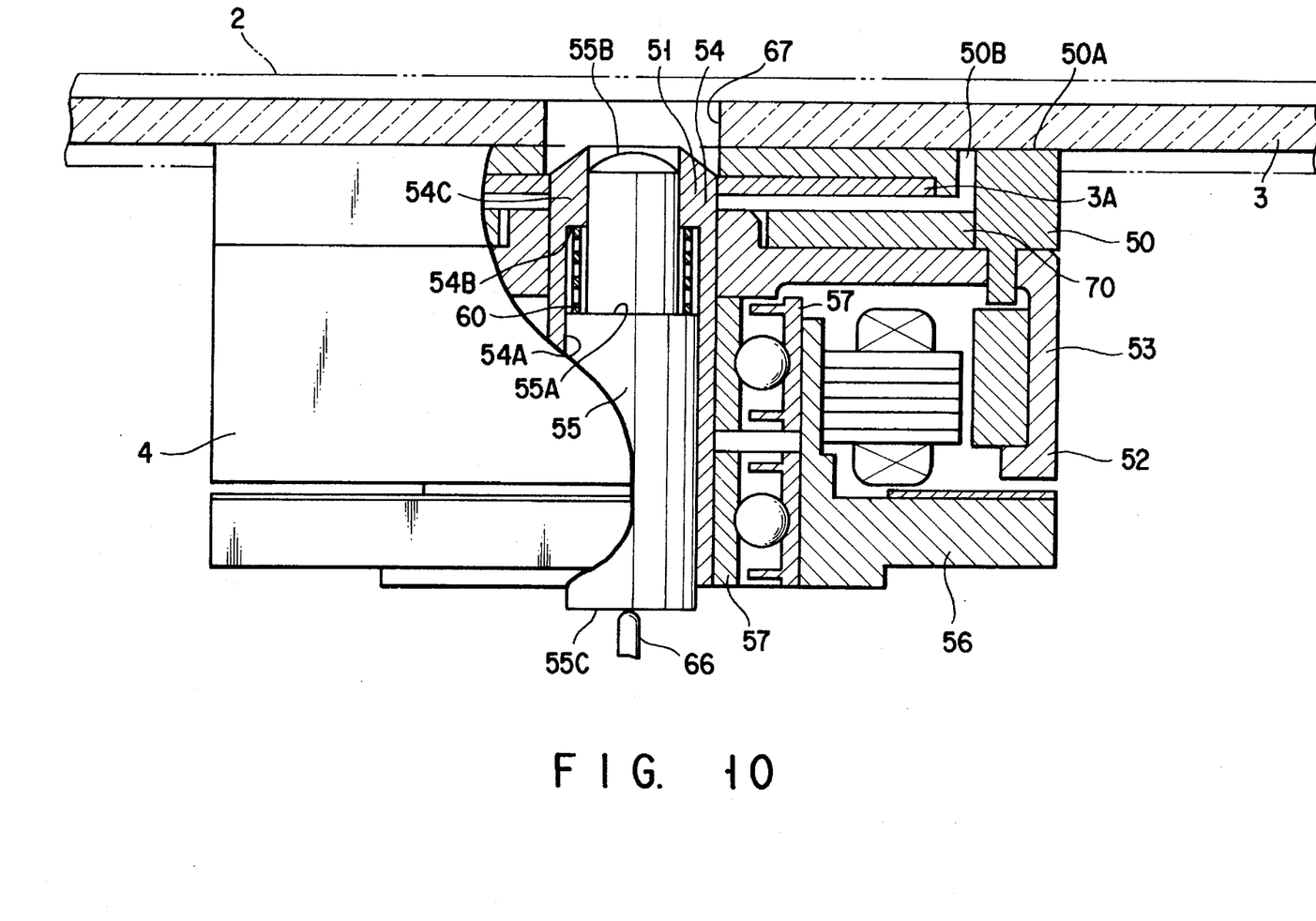
FIG. 10 is a cutaway side view showing a state in which the optical disk is set on the turntable.

Referring now to FIGS. 9 and 10, the relationships between the optical disk 3 and the spindle motor 4 will be described further in detail.

Immediately before the optical disk 3 is set on the turntable 50, as shown in FIG. 9, the inner second spindle 55 of the spindle 51 is kept in the projecting position by the spindle moving mechanism 65, so that its upper end portion 55B projects above the upper surface 50A of the turntable 50. Also, the slanting surface of the upper end portion 54C of the outer first spindle 54 and the slanting surface of the upper end portion 55B of the second spindle 55 are continuous with each other, so that the tip portion of the spindle 51 forms the tapered guide surface. If the cartridge 2 is loaded in a manner such that the center of the center hole 67 of the optical disk 3 is deviated to the right from the center of the spindle 51 by a distance S, therefore, the position of the disk 3 in the state of FIG. 9 can be shifted to the left (in the direction of arrow L) to be corrected as the inner peripheral edge portion of the hole 67 comes into contact with the guide surface of the spindle 51 when the disk 3 descends.

As shown in FIG. 10, the optical disk 3 is set on the turntable 50 in a manner such that its center hole 67 or the center hole of the hub 3A, to be exact, is fitted on the first spindle 54. Thereafter, the second spindle 55 is lowered. In this manner, the optical disk 3 is aligned with respect to the turntable 50. Moreover, the hub 3A of the disk 3 is housed in the recess 50B of the turntable 50, and is attracted to the turntable by the agency of the chucking magnet 70. Thus, the optical disk 3 is positioned so that the lower surface of its body 3B is supported directly on the upper surface 50A of the turntable 50.

According to the optical disk apparatus constructed in this manner, the spindle 51 for centering the optical disk 3 has the dual structure including the outer first spindle 54, which is located lest its upper end portion 54C project above the upper surface 50A of the turntable 50, and the inner second spindle 55, whose upper end portion 55B can project and recede from the upper surface 50A of the turntable 50. When the cartridge 2 is loaded or unloaded, that is, when it is moved in the horizontal direction, the second spindle 55 is lowered to the depressed position by the spindle moving mechanism 65, lest it project above the upper surface 50A of the turntable 50. Immediately before the optical disk 3 is set on the turntable 50, the spindle 55 is caused to project above the upper surface 50A of the turntable 50, thereby centering the disk 3.

In horizontally moving the cartridge 2, with respect to the cartridge holder 17, to insert or eject it, the optical disk 3 and the spindle motor 4 must be prevented from interfering with each other by moving the cartridge 2 to a position at a distance T (see FIG. 10) from the upper surface 50A of the turntable 50. According to the present embodiment, the second spindle 55 is moved to the depressed position as the cartridge 2 moves horizontally, so that there is no possibility of the tip portion of the spindle 51 preventing the movement of the cartridge. Therefore, the distance T can be made shorter than in the case of a conventional apparatus whose spindle tip is always kept projecting above the upper surface of the turntable. Thus, the lift of the cartridge holder 17 can be shortened, so that the whole optical disk apparatus can enjoy a thinner profile.

In the embodiment described above, the spindle moving mechanism 65 is designed so that the lower end face 55C of the inner second spindle 55 is flat, and that the second spindle is pushed up by means of the lifting pin 66 protruding from the operating lever 76 which is swingable around the pivot 75. Alternatively, however, the spindle moving mechanism may be arranged in the manner shown in FIG. 11.

Figure 11:
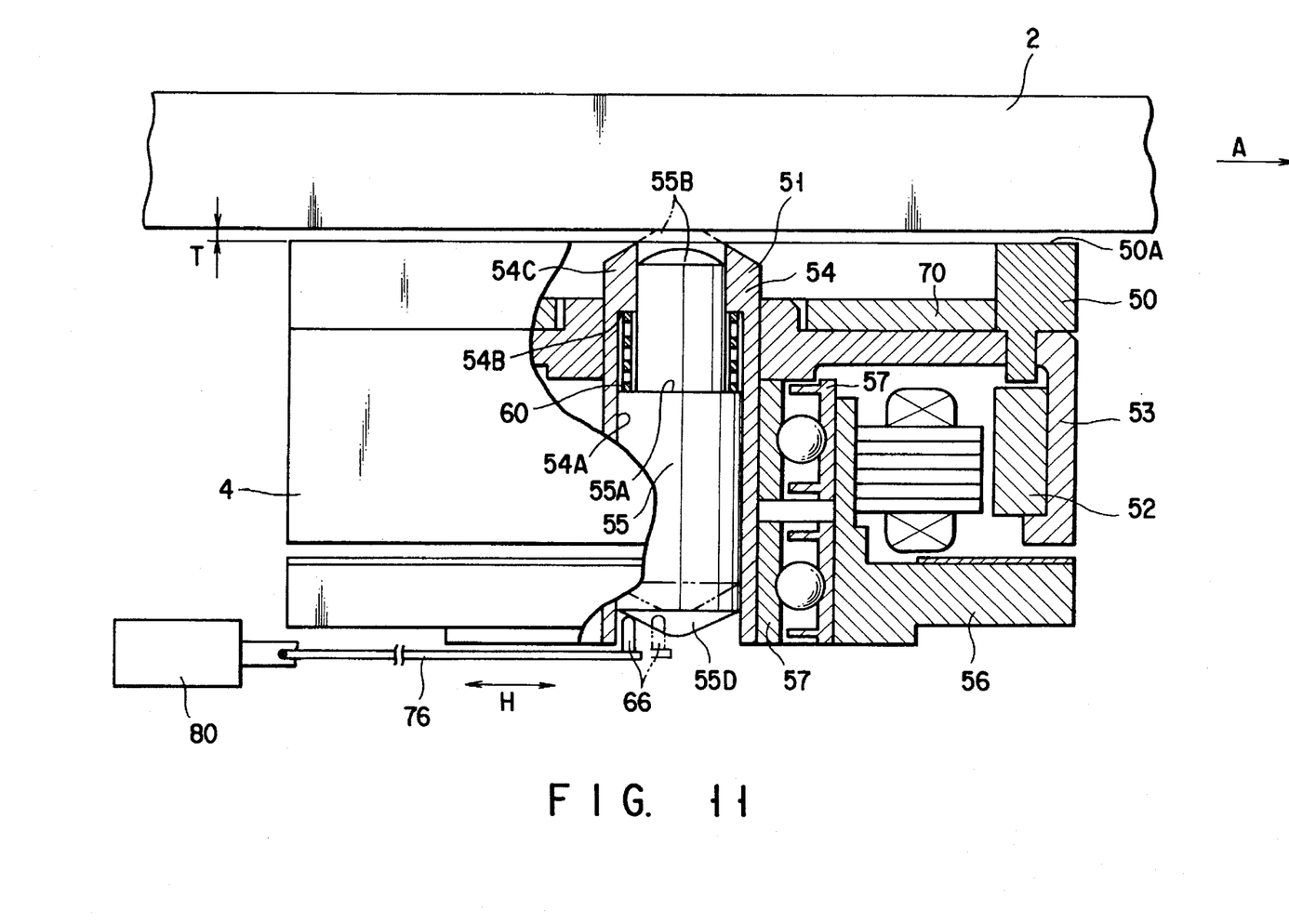
FIG. 11 is a cutaway side view showing the principal part of an optical disk apparatus according to another embodiment of the invention.

According to an alternative embodiment shown in FIG. 11, the lower end face of the inner second spindle 55 is formed as a downwardly convex guide surface 55D having the shape of a gently sloping cone, and the operating lever 76 is movable in the horizontal direction, that is, in the direction perpendicular to the spindle 51. One end of the lever 76 is connected to a solenoid/plunger 80 for use as a drive source, and the lifting pin 66 protrudes from the other end of the lever. The upper end of the pin 66 abuts against the guide surface 55D of the second spindle 55. As the operating lever 67 is moved in the direction of arrow H by means of the plunger/solenoid 80, the lifting pin 66 pushes up the spindle 55.

Figure 12:
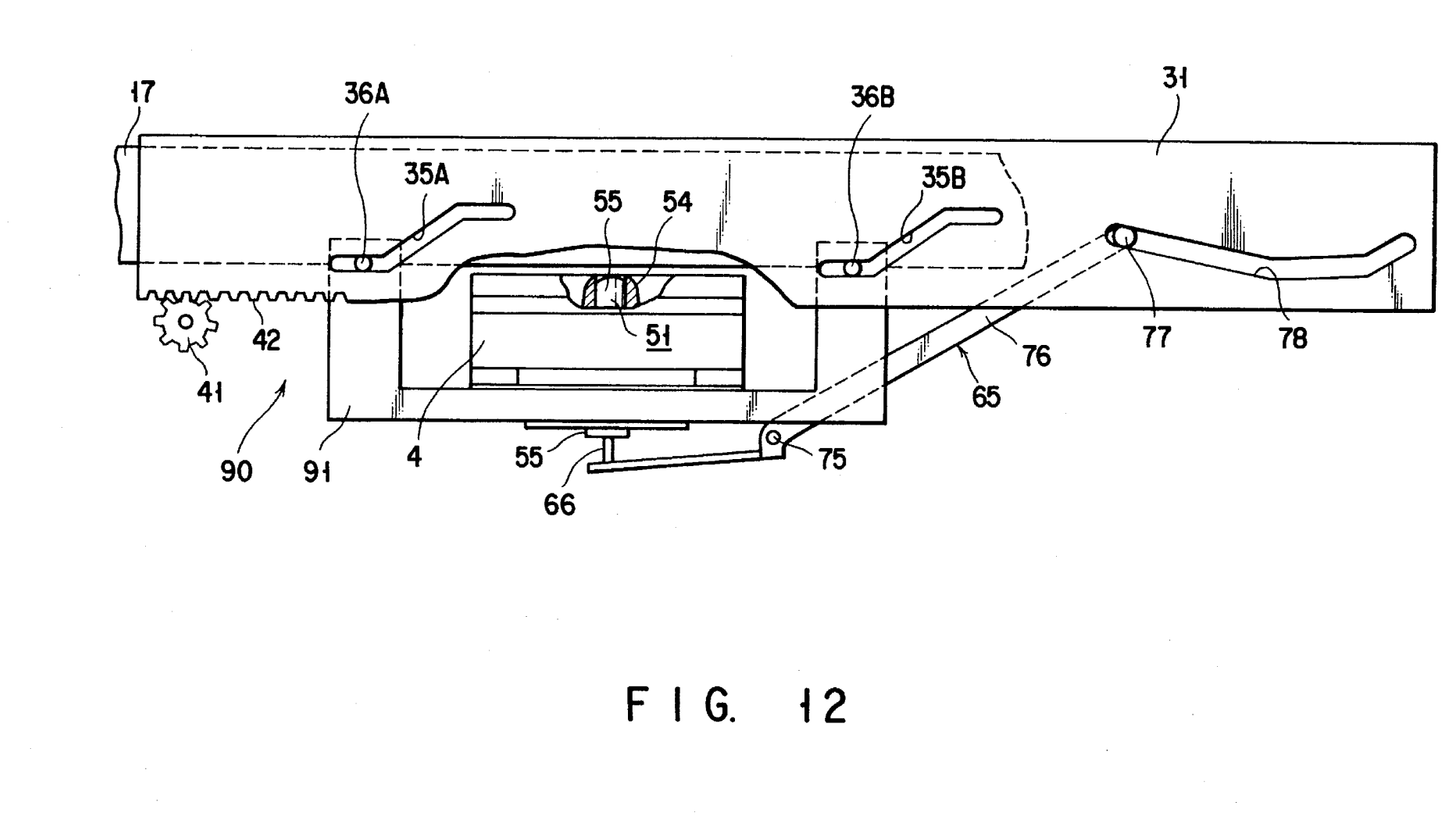
FIG. 12 is a side view showing a loading mechanism at the start of loading operation.
Figure 13:
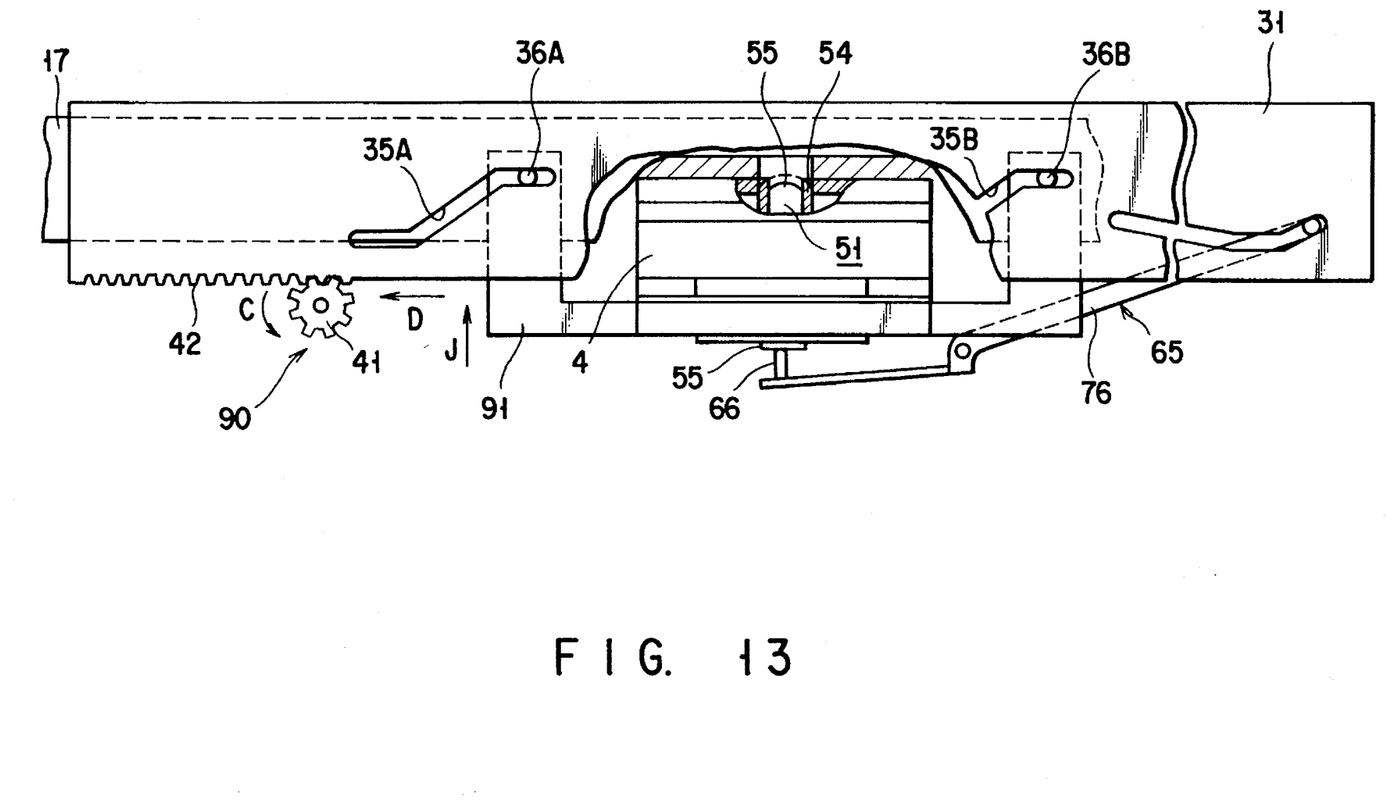
FIG. 13 is a side view showing the loading mechanism at the end of the loading operation.

In the foregoing embodiment, moreover, the loading mechanism 15 is of an up-and-down holder type such that the optical disk 3 is mounted on the spindle motor 4 by raising and lowering the cartridge holder 17 for holding the cartridge 2. Alternatively, however, the mechanism 15 may be of an up-and-down spindle motor type such that the spindle motor 4 is moved up and down with the holder 17 fixed in place, as shown in FIGS. 12 and 13.

In this embodiment, the loading mechanism 15 includes a spindle motor moving mechanism 90, for use as spindle motor moving means, in place of the cartridge holder moving mechanism 27 according to the first embodiment. In the description to follow, like reference numerals are used to designate the same components as the counterparts of the first embodiment, and a repeated description of those components is omitted.

The moving mechanism 90 includes a pair of cam plates 31 (only one of which is shown) each formed having a rack 42 in mesh with a pinion gear 41 which is rotated forwardly and reversely by means of a cam plate drive mechanism having the same construction as the drive mechanism 40 shown in FIG. 4. Each cam plate 31 is formed having two cam slots 35A and 35B which are each composed of two horizontal portions on different levels and a slant portion connecting the two. A spindle motor 4 is mounted on a support frame 91 which is integral with a motor base 56. The frame 91 is fitted with a pair of guide rollers 36A and 36B, which engage their corresponding cam slots 35A and 35B.

When the pinion gear 41 is rotated in the direction of arrow C so that each cam plate 31 is moved in a direction parallel to the bearing surface of the turntable 50, i.e., in the direction of arrow D in setting the optical disk 3, the support frame 91, along with the spindle motor 4, is raised in the direction of arrow J by the agency of the guide rollers 36A and 36B and the cam slots 35A and 35B. In this case, the lift of the frame 91 is adjusted to a necessary distance for the turntable 50 to come into contact with the disk 3 through one of the windows 7 of the cartridge 2. Thus, the motor 4 is moved from a standby position shown in FIG. 12 to a set position shown in FIG. 13 in which the motor 4 engages the optical disk to be ready for recording or reproducing operation. As the pinion gear 41 rotates reversely, moreover, the spindle motor 4 is moved from its set position to its standby position in which it never interferes with the cartridge 2.

In loading or unloading the cartridge 2, the spindle moving mechanism 65, in association with the movement of the cam plates 31, lowers the inner second spindle 55 to a depressed position in which it does not project above the upper surface 50A of the turntable 50. Immediately before the optical disk 3 is set on the turntable 50, the spindle 55 is moved to an engaging position in which the spindle 55 projects above the upper surface 50A of the turntable 50, whereby the disk 3 is centered.

According to the this embodiment, the spindle motor 4 is moved between the set position and the standby position by means of the moving mechanism 90 which includes a pair of cam plates 31 movable in a direction substantially parallel to the bearing surface of the turntable 50, rack 42, and etc. Thus, the amount of movement of the spindle motor 4 can be made short and the whole optical disk apparatus can enjoy a thinner profile.

Further, the second spindle 55 is moved to the depressed position as the cartridge 2 moves horizontally, so that there is no possibility of the tip portion of the spindle 51 preventing the movement of the cartridge. Therefore, the amount of movement of the spindle motor 4 can be made shorter than in the case of an apparatus whose spindle tip is always kept projecting above the upper surface of the turntable. Thus, the whole optical disk apparatus can enjoy a thinner profile.

Although the information processing apparatus which processes information by receiving the cartridge 2 containing the optical disk 3, for use as an information recording medium, has been described herein, the present invention is not limited to this, and may be also applied to an information processing apparatus which directly receives the optical disk 3 for information processing.

What is claimed is:

1. An information processing apparatus for reproducing data from a disk-shaped optical information recording medium having a center portion on which a hub is provided, the hub being formed of a magnetic material and having a center hole, the apparatus comprising:

a turntable for supporting the recording medium, the turntable including a bearing surface on which the recording medium is to be placed, the bearing surface having a recess formed therein for storing the hub of the recording medium when the recording medium is placed on the bearing surface, and a magnet arranged in the recess for magnetically attracting the hub so that the recording medium placed on the bearing surface is in tight contact with the bearing surface;

means having a rotating shaft portion, for rotating the turntable together with the recording medium placed on the bearing surface, the rotating shaft portion including a cylindrical first shaft projecting from a center of a bottom of the recess and having an upper end substantially flush with the bearing surface, for engaging the center hole of the hub stored in the recess, and a second shaft having an upper end portion and movable in the first shaft between a first position in which the upper end portion of the second shaft projects from the upper end of the first shaft to engage the center hole of the hub of the recording medium placed on the bearing surface and a second position in which the upper end portion of the second shaft is recessed in the first shaft to disengage from the center hole; and means for moving the second shaft from the first position to the second position as the recording medium is to be placed on and removed from the bearing surface.

2. An information processing apparatus according to claim 1, which further comprise means for shifting the rotating means together with the turntable between a third position in which the recording medium is placed on the bearing surface of the turntable and a fourth position in which the recording medium is away from the bearing surface.

3. An information processing apparatus according to claim 2, wherein the second moving means includes urging means for urging the second shaft toward the second position and push means for pushing the second shaft to the first position when the rotating means and the are moved to the third position.

4. An information processing apparatus according to claim 2, wherein said shifting means includes a cam member movable in a direction substantially parallel to the bearing surface, drive means for moving the cam member, and connecting means for connecting the rotating means to the cam member so that the rotating means moves between the third position and the fourth position in association with the movement of the cam member.

5. An information processing apparatus for reproducing data from a disk-shaped optical information recording medium having a center portion on which a hub is provided, the hub being formed of a magnetic material and having a center hole, the apparatus comprising:

a housing;

means for holding the recording medium inserted into the housing;

a spindle motor for rotating the recording medium held by the holding means, the spindle motor including:

a turntable for supporting the recording medium, the turntable having a bearing surface on which the recording medium is to be placed and a recess formed in the bearing surface for storing the hub of the recording medium when the recording medium is placed on the bearing surface, a spindle projecting from a center portion of the recess for engaging the center hole of the recording medium so as to locate a rotational center of the recording medium, a motor section for rotating the turntable and the spindle, the motor section having a motor base rotatably supporting the spindle and a rotor fitted to the spindle and coupled with the turntable for rotating the spindle and the turntable integrally with each other, and a magnet arranged in the recess for magnetically attracting the hub so that the recording medium is in tight contact with the bearing surface of the turntable when the recording medium is placed on the bearing surface while the spindle is inserted into the center hole of the hub and the hub is stored in the recess; and means for moving the spindle motor in a first direction substantially perpendicular to the bearing surface between a set position wherein the recording medium held by the holding means is supported on the turntable and rotated by the motor section and a standby position wherein the recording medium is away from the turntable and the spindle is disengaged from the center hole of the hub, the moving means including:

a support frame coupled with the motor base and having a plurality of first guide rollers, each guide roller having a circumferential surface, a pair of parallel guide plates extending in an insertion direction of the recording medium with respect to the housing and arranged in the housing to be located on both sides of the holding means, each of the guide plates having a plurality of guide slots extending in a second direction substantially parallel to the bearing surface, and a pair of guide end faces extending in the first direction for abutting against the respective circumferential surfaces of the first guide rollers to restrict movement of the first guide rollers in the second direction and for guiding movement of the first guide rollers in the first direction in accordance with the movement of the spindle motor, a pair of cam plates, each of which is arranged between each of the guide plates and the holding means, each of the cam plates having a side surface opposing the guide plate and a plurality of second guide rollers provided on the side surface and engaging the respective guide slots so that the cam plate is movable in the second direction, each of the cam plates having cam slots engaging the first guide rollers on the support frame, for guiding the movement of the first guide rollers in the first direction in association with the guide end faces of the guide plates so as to guide the movement of the spindle motor in the first direction when the cam plates are moved in the second direction, each of the cam slots having a pair of horizontal portions spaced in the first direction and corresponding to the set position and the standby position, respectively, and a slant portion connecting the horizontal portions to each others, and drive means for moving the cam plates in the second direction.

6. An information processing apparatus according to claim 5, wherein the moving means includes a rack formed in the cam plate, a pinion gear engaging the rack, and a motor for rotating the pinion gear.

* * * * *